United States Patent
Lin

(10) Patent No.: US 8,449,282 B2
(45) Date of Patent: *May 28, 2013

(54) MOLD FOR MOLDING OPTICAL FIBER CONNECTOR

(75) Inventor: I-Thun Lin, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 348 days.

This patent is subject to a terminal disclaimer.

(21) Appl. No.: 12/965,900

(22) Filed: Dec. 12, 2010

(65) Prior Publication Data

US 2011/0287125 A1    Nov. 24, 2011

(30) Foreign Application Priority Data

May 20, 2010 (TW) .............................. 99116041 A

(51) Int. Cl.
    *B29C 45/36*    (2006.01)
(52) U.S. Cl.
    USPC ............ 425/190; 425/577; 425/468; 249/177
(58) Field of Classification Search
    USPC ............................ 425/190, 577, 468; 249/177
    See application file for complete search history.

(56) References Cited

U.S. PATENT DOCUMENTS

| | | | | |
|---|---|---|---|---|
| 4,711,752 A * | 12/1987 | Deacon et al. | ........... | 264/328.12 |
| 5,269,998 A * | 12/1993 | Takagi et al. | .............. | 264/328.1 |
| 5,786,002 A * | 7/1998 | Dean et al. | ..................... | 425/183 |
| 6,074,577 A * | 6/2000 | Katsura et al. | ............... | 264/1.25 |
| 6,663,377 B1 * | 12/2003 | Dean et al. | ..................... | 425/190 |
| 6,719,927 B2 * | 4/2004 | Sakurai et al. | ............... | 264/1.25 |
| 6,767,199 B2 * | 7/2004 | Dean et al. | ................. | 425/192 R |
| 7,086,847 B2 * | 8/2006 | Dean et al. | ..................... | 425/190 |

* cited by examiner

*Primary Examiner* — James Sanders

(74) *Attorney, Agent, or Firm* — Altis Law Group, Inc.

(57) ABSTRACT

A mold for molding optical fiber connector includes a core pin, a core mold and a cavity mold. The core pin has insertion portion and a blind hole forming portion. The core mold defines a hole for receiving the insertion portion. The cavity mold attaches to the core mold and cooperatively defines a molding cavity for forming the optical fiber connector. The cavity mold includes a lens forming portion and a support block in the molding cavity. The core pin aligns with the lens forming portion and the blind hole forming portion thereof is exposed in the molding cavity. The support block is configured for holding the blind hole forming portion and maintaining alignment between the core pin and the lens forming portion.

6 Claims, 4 Drawing Sheets

MOLD FOR MOLDING OPTICAL FIBER CONNECTOR

BACKGROUND

1. Technical Field

The present disclosure relates to molds, and particularly, to a mold for molding an optical fiber connector.

2. Description of Related Art

Optical fiber connectors typically include a lens and a blind hole behind the lens. The blind hole receives an optical fiber. The lens receives and guides light from the optical fiber. The alignment accuracy between the blind hole and the lens is very important to the optical transmission ability of the optical fiber connectors.

Injection molding is a current molding method for molding optical fiber connectors. The mold used in injection molding includes a core pin used to mold the blind hole and a lens forming portion corresponding with the core pin. During the injection molding process, the core pin must keep alignment with the lens forming portion to make sure the alignment accuracy between the blind hole and the lens of the molded optical fiber connector.

However, the longitudinal axis of the blind hole usually deviates from the central axis of the lens in the optical fiber connector mold by the above-mentioned method. The main reason is that the impact of the molding material during the molding process causes the core pin to bend, thus causing the longitudinal axis of the core pin inclination relative to the central axis of the lens forming portion (the central axis of the lens forming portion coincides with an optical axis of the molded lens).

Therefore, a mold for molding optical fiber connectors, which can overcome the above-mentioned problems, is needed.

DETAILED DESCRIPTION

Figure 1:
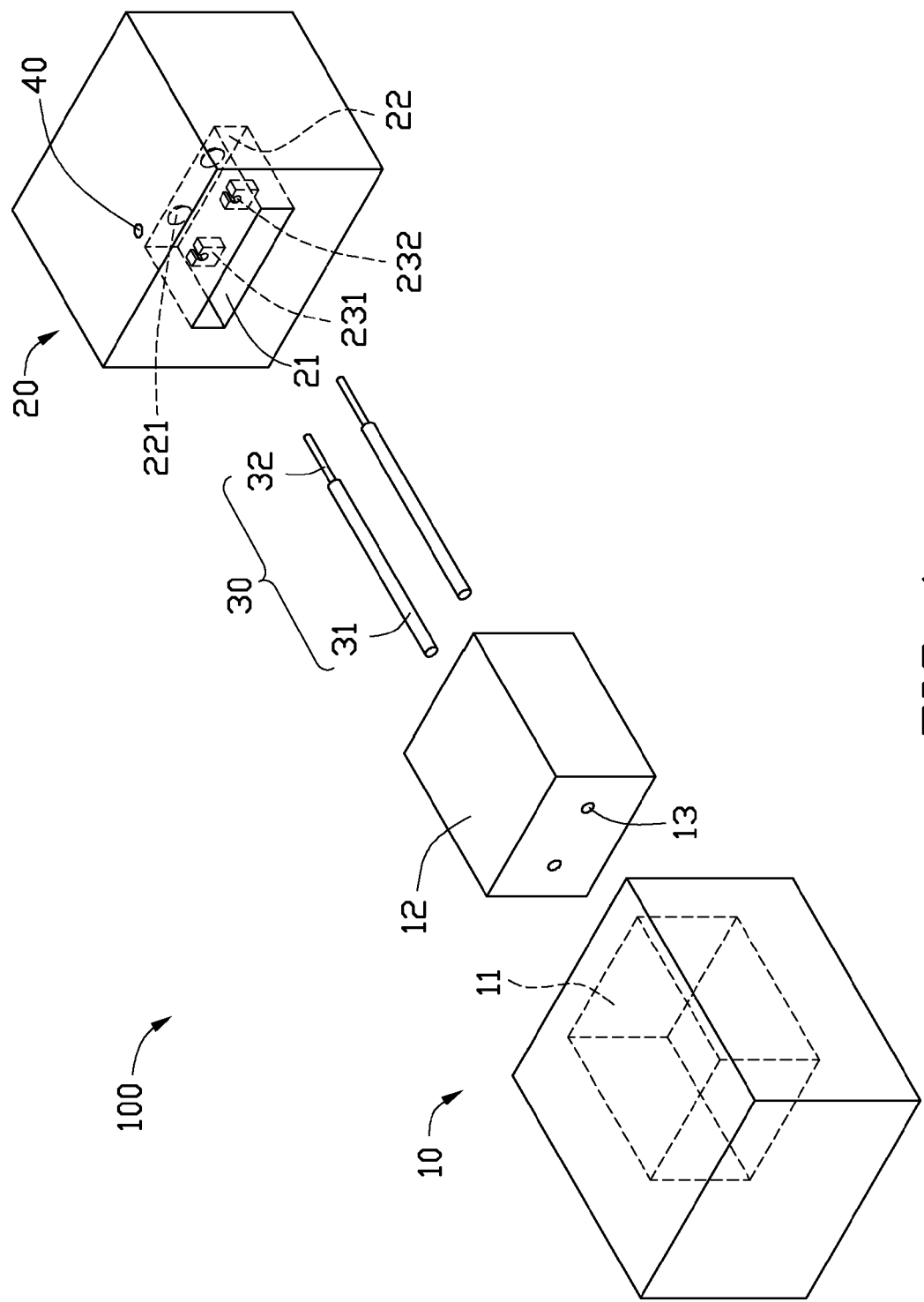
FIG. 1 is an exploded view of a mold for molding an optical fiber connector, according to an exemplary embodiment.
Figure 2:
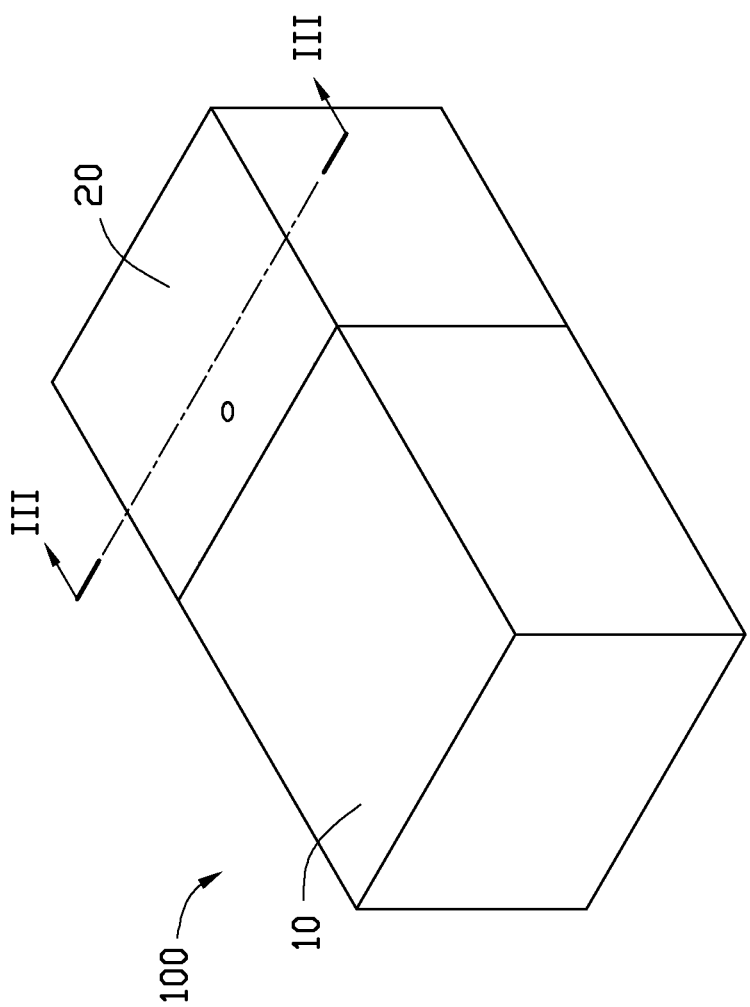
FIG. 2 is an assembled view of the mold of FIG. 1.
Figure 3:
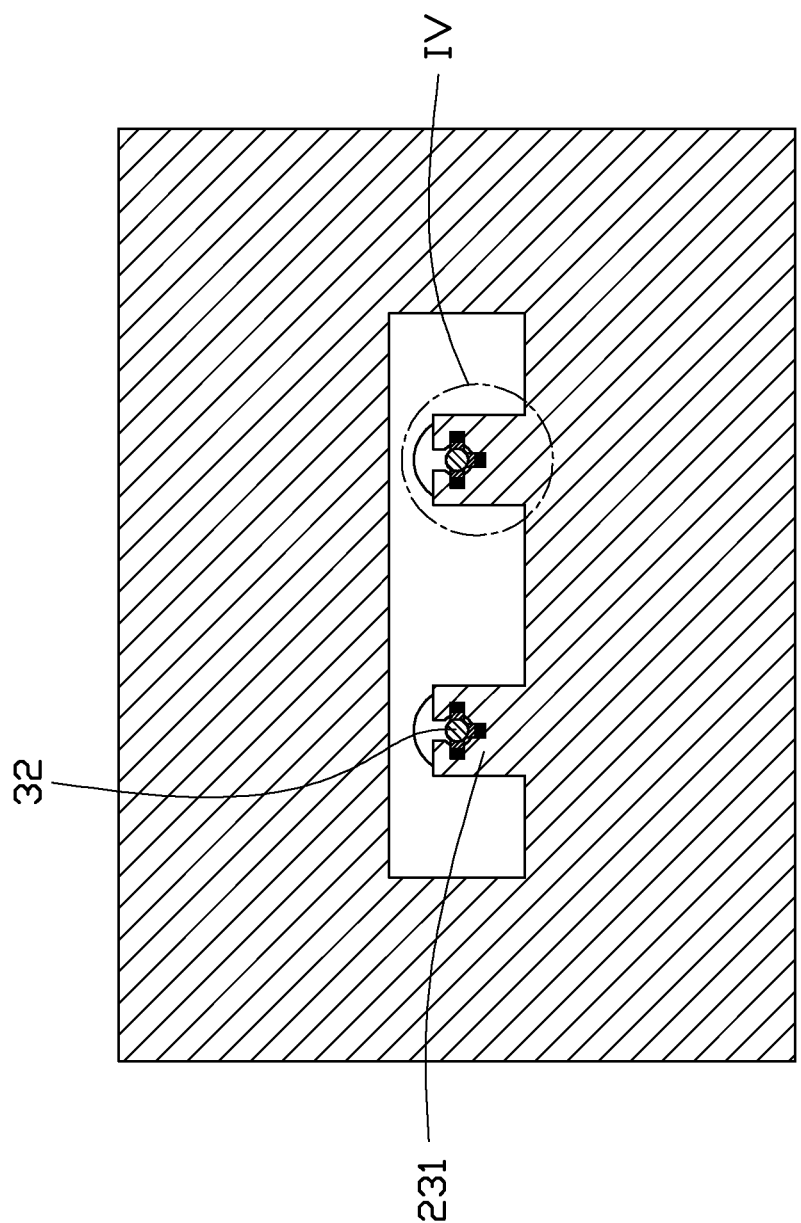
FIG. 3 is a sectional view taken along line of the mold of FIG. 2.
Figure 4:
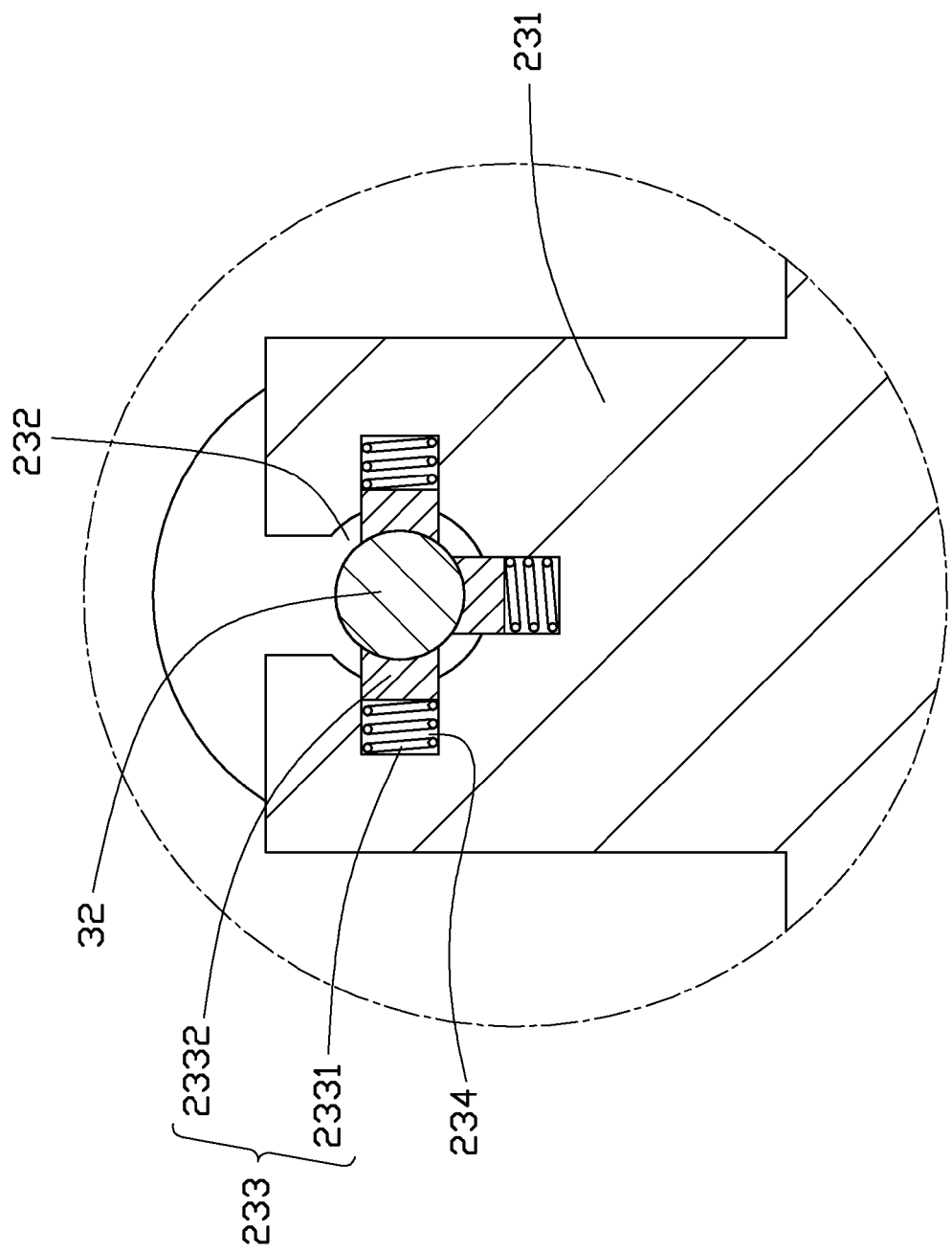
FIG. 4 is an enlarged view of part IV of the mold of FIG. 3.

Referring to FIGS. 1 to 4, a mold 100, according to an exemplary embodiment, molds an optical fiber connector (not shown). The optical fiber connector includes blind holes and lenses.

The mold 100 includes a core mold 10, a cavity mold 20 and two core pins 30. The core pin 30 includes an insertion portion 31 and a blind hole forming portion 32. The blind hole forming portion 32 molds the blind hole of the optical fiber connector.

The cavity mold 20 and the core mold 10 cooperatively define a molding cavity 21 for forming the optical fiber connector. The molding cavity 21 includes a support surface 22. The support surface 22 defines two lens forming portions 221. The lens forming portion 221 form the lens of the optical fiber connector. After the mold 100 is assembled, the insertion portion 31 of the core pin 30 is fixed by the core mold 10 and the blind hole forming portion 32 of the core pin 30 stretches into the molding cavity 21 and aligns with the lens forming portion 221.

The cavity mold 20 also includes two support blocks 231 in the molding cavity 21, corresponding with the two lens forming portions 221. Each support block 231 defines an alignment groove 232 to clamp the blind hole forming portion 32 to make the blind hole forming portion 32 align with the corresponding lens forming portion 221 during the molding process.

In the present embodiment, each support block 231 also includes a plurality of spring-loaded clamps 233 arranged in the alignment groove 232. The spring-loaded clamps 233 are configured to surround and abut against the blind hole forming portion 32. Each support block 231 includes a plurality of notches 234 defined in an inner wall thereof in the alignment groove 232 corresponding with the spring-loaded clamps 233. Each spring-loaded clamp 233 includes a spring element 2331 and a clamping block 2332 both received in the corresponding notch 234. One end of the spring element 2331 is fixed on the bottom of the notch 234 and the other end is connected to the clamping block 2332. The clamping block 2332 is partially received in the notch 234 and extends through the notch 234 to elastically abut the blind hole forming portion 32 of the core pin 30. Thus, the blind hole forming portion 32 can be securely held/supported by the spring-loaded clamps 233 in the alignment groove 232. An outer surface of the clamping block 2332 abutting the blind hole forming portion 32 is shaped to conform to the blind hole forming portion 32. Furthermore, spring-loaded clamps 233 can adapt to different core pins having different diameters because of elasticity of spring-loaded clamps 233. This avoids a mismatch between the size of the alignment groove 232 and the diameter of the blind hole forming portion 32 of the core pin 30. It is to be understood that in alternative embodiment, spring-loaded clamps 233 can be omitted and the alignment groove 232 which the size matches with the diameter of the blind hole forming portion 32 to clamp the blind hole forming portion 32 may be directly used.

The core mold 10 has a containing chamber 11 and a block 12 mounted in the containing chamber 11. The block 12 defines two holes 13 corresponding with the two lens forming portion 221 of the cavity mold 20. The hole 13 is used to hold the insertion portion 31 of the core pin 30 so that the core pin 30 aligns with the corresponding lens forming portion 221. In the present embodiment, the hole 13 is a blind hole. It is to be understood that in alternative embodiments, the holes 13 may be a through hole and the number of the holes 13 may be different and depends on the pattern of the optical fiber connector molded by the mold 100.

The mold 100 also includes a sprue hole 40. The sprue hole 40 allows the molding material to go into the molding cavity 21.

During the process of molding an optical fiber connector using the mold 100, the blind hole forming portion 32 can be fixed by the support block 231 in the molding cavity 21, which can largely eliminate the effect of the impact of the molding material on the blind hole forming portion 32. Therefore, the alignment accuracy between the longitudinal axis of the blind hole and the central axis of the lens in the optical fiber connector molded by the mold 100 is improved.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A mold for molding an optical fiber connector, the optical fiber connector including a blind hole and a lens optical coupling with the blind hole, the mold comprising:
 a core pin including an insertion portion and a blind hole forming portion;
 a core mold receiving the insertion portion; and
 a cavity mold defining a molding, cavity and a positioning block in the molding cavity, the molding cavity defining a lens forming portion for forming the lens, the positioning block being correspond with the lens forming portion, the positioning block defining a positioning structure for holding the blind hole forming portion and maintaining alignment between the blind hole forming portion and the lens forming portion.

2. The mold of claim 1, wherein the positioning structure is a through hole.

3. The mold of claim 1, wherein he positioning structure is a groove.

4. The mold of claim 2 or claim 3, wherein the sidewall of the positioning, structure define a plurality of recesses, each recess configures an elastic element and a clamping block, one side of the elastic element abut the sidewall of the recess and the other side of the elastic element abut the clamping block, and the clamping block elastically abuts against the blind hole forming portion by the force afforded by the elastic element.

5. The mold of claim 4, wherein the resisting surface of the resisting block for resisting the blind hole forming portion is an arc surface.

6. The mold of claim 4, wherein the cavity mold defines a containing cavity and a fixing block in the containing cavity, and the fixing block defines a containing hole for holding the insertion portion of the core pin.

* * * * *